(12) United States Patent
Yoshioka

(10) Patent No.: US 6,574,463 B1
(45) Date of Patent: Jun. 3, 2003

(54) FAILURE DETECTING STRUCTURE OF EMERGENCY CALL TERMINAL DEVICE

(75) Inventor: Kenji Yoshioka, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/553,024

(22) Filed: Apr. 20, 2000

(30) Foreign Application Priority Data

Apr. 28, 1999 (JP) .......................................... 11-122607

(51) Int. Cl.⁷ ............................................. H04M 11/00
(52) U.S. Cl. ................. 455/404; 455/456; 342/357.01; 342/357.1; 340/989
(58) Field of Search ................................ 455/404, 414, 455/456, 521, 565, 550; 342/357.06, 357.08, 357.1; 340/901, 902, 903, 904, 991, 989, 517, 521, 522, 523; 701/213, 214

(56) References Cited

U.S. PATENT DOCUMENTS 3,804,984 A * 4/1974 Yachabach .................. 379/36
4,792,986 A * 12/1988 Garner et al. ............... 455/575
5,461,664 A * 10/1995 Cappadona .................. 455/572
5,497,149 A * 3/1996 Fast ........................... 340/988

FOREIGN PATENT DOCUMENTS

DE          4421508       12/1994
KR       1994-0013063     6/1994
KR       1998-021120      6/1998

* cited by examiner

*Primary Examiner*—Edward F. Urban
*Assistant Examiner*—Temica M. Davis
(74) *Attorney, Agent, or Firm*—Louis Woo (57) ABSTRACT

An emergency call terminal device is provided which may be employed in automotive vehicles to transmit, in the event of an emergency, data on the current location of the vehicle and registered information about the vehicle to an emergency center. The emergency call terminal device is designed to produce signals different in voltage level from each other depending upon operating states of an emergency call push button for discriminating between an open circuit-caused failure resulting from formation of an open circuit of an internal circuit of the device caused by an accidental disconnection of the internal circuit from the emergency call push button and a short circuit-caused failure resulting from formation of a short circuit of the internal circuit to ground caused by an accidental disconnection of the internal circuit from the emergency call push button.

14 Claims, 9 Drawing Sheets

FAILURE DETECTING STRUCTURE OF EMERGENCY CALL TERMINAL DEVICE

BACKGROUND OF THE INVENTION

1. Technical Field of the Invention

The present invention relates generally to an emergency call terminal device which may be employed in automotive vehicles to transmit, in the event of an emergency, data on the current location of the vehicle and registered information about the vehicle to an emergency center controlling an emergency call system to establish an emergency call connection to a police station, a fire department, etc. and more particularly to an improved structure of an emergency call terminal device designed to detect a failure of the device such as a disconnection of an emergency call button from a control circuit.

2. Background Art

There are known automotive emergency call terminal devices equipped with an emergency telephone call unit which establishes a call connection to an emergency center through a base station of a typical telecommunication network. The automotive emergency call terminal devices are generally broken down into two types: the first type in which an emergency call button is manually pushed to output a calling signal and the second type in which a calling signal is outputted automatically in response to an output from an airbag sensor or a collision sensor. Some of the automotive emergency call terminal devices of the first type are designed to detect an accidental disconnection of a signal line from the emergency call button, resulting in formation of an open circuit. Specifically, the terminal devices of this type include a control circuit which monitors the depression of the emergency call button and disconnection of the signal line leading to the emergency call button to perform necessary operations. The connection of the emergency call button and the control circuit is established through a switch upon depression of the emergency call button. The switch connects at one end with the emergency call button and at the other end with ground. The control circuit receives an input signal of a ground potential when the emergency call button is pushed, an input signal of a voltage depending upon a resistance ratio of a pull-up resistor to the switch when the emergency call button is not pushed, and an input signal of a pull-up voltage when the signal line is disconnected undesirably from the emergency call button, resulting in formation of an open circuit of the control circuit. This prior art structure, therefore, encounters a drawback in that when the signal line is disconnected from the emergency call button, thereby causing the control circuit to be short-circuited to ground, it will cause the ground potential to appear at the control circuit, thereby making it difficult to discriminate between the disconnection of the signal line leading to formation of the open circuit of the control circuit and one leading to formation of the short circuit of the control circuit to ground.

SUMMARY OF THE INVENTION

It is therefore a principal object of the present invention to avoid the disadvantages of the prior art.

It is another object of the present invention to provide an emergency call terminal device capable of discriminating between an open circuit-caused failure resulting from formation of an open circuit of an internal circuit of the device caused by an accidental disconnection of the internal circuit from an emergency call push button and a short circuit-caused failure resulting from formation of a short circuit of the internal circuit to ground caused by an accidental disconnection of the internal circuit from the emergency call push button.

According to one aspect of the invention, there is provided an emergency call terminal device which comprises: (a) an emergency call circuit responsive to a call request signal to output an emergency call signal to a preselected emergency center; (b) an emergency call switch connected to the emergency call circuit, the emergency call switch being designed to be switched between an ON-state and an OFF-state, when the emergency call switch is brought into the ON-state, the call request signal being provided to the emergency call circuit; and (c) an operating state signal producing circuit producing a first, a second, a third, and a fourth operating state signal different in voltage level from each other for enabling the emergency call circuit to discriminate the ON-state, the OFF-state, an open circuit-caused failure, and a short circuit-caused failure. The first operating state signal is produced when the emergency call switch is in the ON-state. The second operating state signal is produced when the emergency call switch is in the OFF-state. The third operating state signal is produced when the open circuit-caused switching failure results from formation of an open circuit of the emergency call circuit caused by a disconnection of the emergency call circuit from the emergency call switch. The fourth operating state signal is produced when the short circuit-caused failure results from formation of a short circuit of the emergency call circuit caused by a disconnection of the emergency call circuit from the emergency call switch.

In the preferred mode of the invention, the operating state signal producing circuit includes a first resistor connected to a first and a second end of the emergency call switch, a second resistor connected between the first end of the emergency call switch and ground, and a third resistor connected between a voltage source and a junction of the emergency call circuit and the second end of the emergency call switch.

The operating state signal producing circuit may alternatively include a first resistor connected between a first end of the emergency call switch and ground, a second resistor connected between a second end of the emergency call switch and ground, and a third resistor connected between a voltage source and a junction of the emergency call circuit and the second end of the emergency call switch.

The operating state signal producing circuit may alternatively include a first and a second resistor connected in series between a first end of the emergency call switch and ground, a third resistor connected between a junction of the first and second resistors and the second end of the emergency call switch, and a fourth resistor connected between a voltage source and a junction of the emergency call circuit and the second end of the emergency call switch.

The operating state signal producing circuit may alternatively include a first and a second resistor connected in series between a first end of the emergency call switch and ground, a third resistor connected between ground and a second end of the emergency call switch, and a fourth resistor connected between a voltage source and a junction of the emergency call circuit and the second end of the emergency call switch.

The operating state signal producing circuit may alternatively include a first resistor connected to a first end of the emergency call switch leading to ground and a second end of the emergency call switch, a second resistor connected between the second end of the emergency call switch and the emergency call circuit, and a third resistor connected between a voltage source and a junction of the emergency call circuit and the second end of the emergency call switch.

The operating state signal producing circuit may alternatively include a first resistor connected to a first end of the emergency call switch and a first junction leading to the emergency call circuit, a second resistor connected to the first junction and ground in parallel to the emergency call switch and the first resistor, and a third resistor connected between a voltage source and a second junction which connects the emergency call circuit and the first junction.

The operating state signal producing circuit may alternatively include a first resistor connected between a first end of the emergency call switch and ground, a second resistor connected between a second end of the emergency call switch and the emergency call circuit, a third resistor connected between the second end of the emergency call switch and ground in parallel to the emergency call switch and the first resistor, and a fourth resistor connected between a voltage source and a junction of the emergency call circuit and the second resistor.

The operating state signal producing circuit may alternatively include a first resistor connected between a first end of the emergency call switch and ground, a second resistor connected between a second end of the emergency call switch and a first junction leading to the emergency call circuit, a third resistor connected between the first junction and ground in parallel to the emergency call switch and the first and second resistors, and a fourth resistor connected between a voltage source and a second junction which connects the first junction and the emergency call circuit.

The operating signal producing circuit produces the third and fourth operating state signals using functions of pull-up and pull-down resistors.

The emergency call circuit receives the first, the second, the third, and the fourth operating state signals through one of an A/D converter and an A/D converter built in a microcomputer.

According to another aspect of the invention, there is provided an emergency call system which comprises an emergency center and an emergency call terminal device. The emergency call terminal device includes, (a) an emergency call circuit responsive to a call request signal to output an emergency call signal to the emergency center, (b) an emergency call switch connected to the emergency call circuit, the emergency call switch being designed to be switched between an ON-state and an OFF-state, when the emergency call switch is brought into the ON-state, the call request signal being provided to the emergency call circuit, and (c) an operating state signal producing circuit producing a first, a second, a third, and a fourth operating state signal different in voltage level from each other for enabling the emergency call circuit to discriminate the ON-state, the OFF-state, an open circuit-caused failure, and a short circuit-caused failure. The first operating state signal is produced when the emergency call switch is in the ON-state. The second operating state signal is produced when the emergency call switch is in the OFF-state. The third operating state signal is produced when the open circuit-caused switching failure results from formation of an open circuit of the emergency call circuit caused by a disconnection of the emergency call circuit from the emergency call switch. The fourth operating state signal is produced when the short circuit-caused failure results from formation of a short circuit of the emergency call circuit caused by a disconnection of the emergency call circuit from the emergency call switch.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
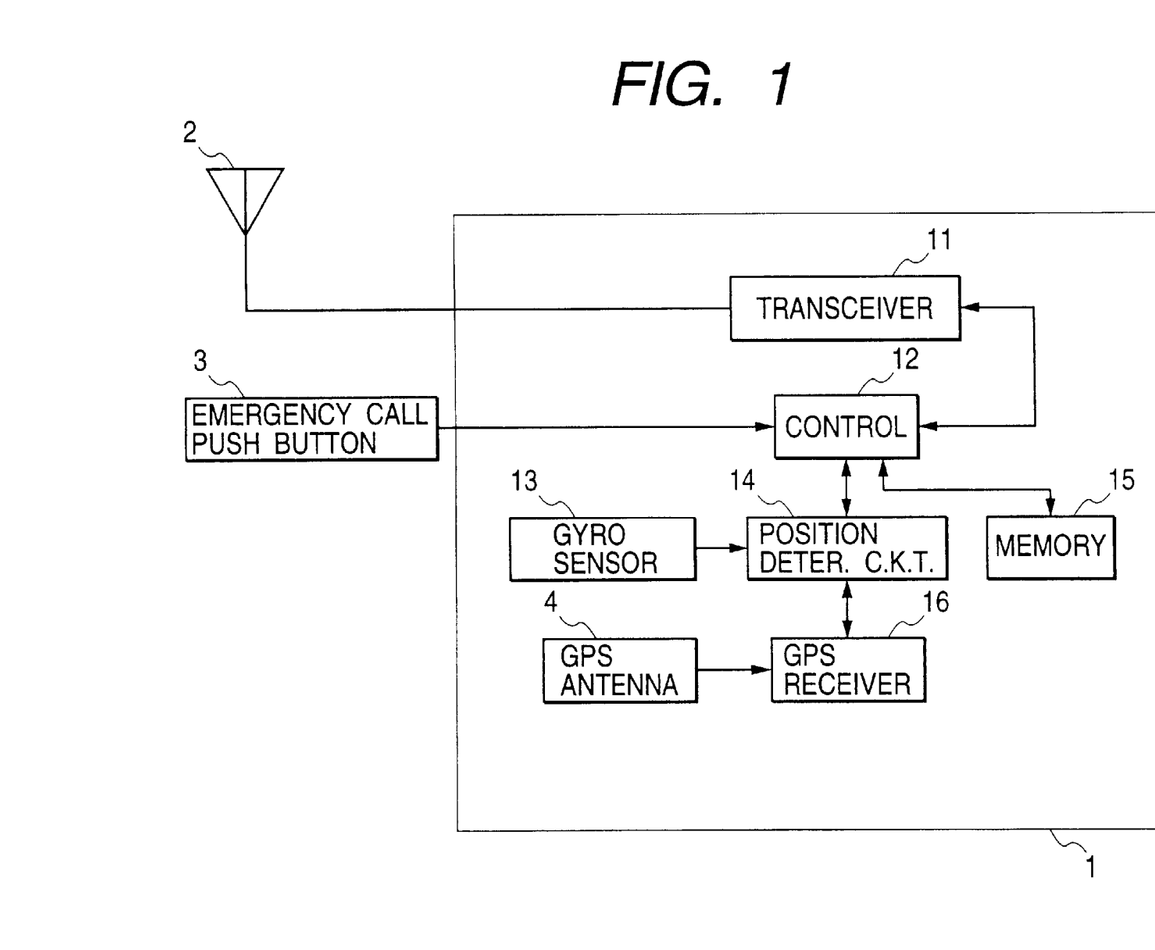
FIG. 1 is a block diagram which shows an emergency call terminal device according to the invention.

Referring now to the drawings, wherein like numbers refer to like parts in several views, particularly to FIG. 1, there is shown an emergency call terminal device 1 according to the present invention which may be installed in automotive vehicles to transmit data on the current location of the vehicle and pre-defined vehicle description information, e.g., a license plate number, a registered ID number, etc. to an emergency center in order to request emergency assistance in the event of an emergency such as traffic accident or sudden illness.

The emergency call terminal device 1 includes generally an antenna 2, an emergency call push button 3, a GPS (Global Positioning System) antenna 4, a transmitter 11, a controller 12, a gyrosensor 13, a position determining circuit 14, a memory 15, and a GPS receiver 16.

The antenna 2 transmits an emergency calling signal to the emergency center through a base station of a communication system such as a typical cellular phone system and receives an answering signal from the emergency center. The emergency call push button 3 is installed near a vehicle operator and outputs an ON-signal to the controller 12 when pushed manually by the operator in order to request emergency help. The emergency call push button 3 is also designed to produce failure signals indicating a disconnection of the emergency call push button 3 from the controller 12 caused by, for example, an accidental vehicle collision, resulting in an open circuit of the controller 12 and short-circuiting of the controller 12 caused by an accidental connection to the body of the vehicle (i.e., ground). The GPS receiver 4 receives data from GPS satellites.

The transceiver 11 is responsive to a call request signal from the controller 12 to initiate a process of dialing an emergency phone number inputted from the controller 12 to make a connection to a preselected emergency center. The controller 12 is designed to provide, as the call request signal, one of a data transfer request signal and a voice communication request signal selectively or both sequentially. Upon reception of the call request signal, the emergency call center outputs an answer signal to the emergency call terminal device 1 to allow either data on the traveling direction, location of the vehicle, the vehicle description information, etc. read out of the controller 12 to be transferred to the emergency center or a voice communication to be initiated therebetween.

The controller 12 reads the data on location of the vehicle etc. out of the position determining circuit 14 and stores it in the memory 15. When the ON-signal indicating an emergency call request is outputted from the emergency call push button 3, the controller 12 reads the data on current location and traveling direction of the vehicle out of the position determining circuit 14 and also reads the location history data, the phone number of the emergency center, and the vehicle description information out of the memory 15 and outputs the call request signal to the transceiver 11.

The gyro sensor 13 monitors the traveling direction or orientation of the vehicle and outputs a signal indicative thereof to the position determining circuit 14. The GPS receiver 16 receives input signals from the GPS antenna 4 indicating the location of the vehicle and outputs them to the position determining circuit 14. The position determining circuit 14 receives the signals from the gyro sensor 13 and the GPS receiver 16 to produce data on the direction and location of the vehicle and transfers them to the controller 12 as requested. The memory 15 stores therein the vehicle description information (e.g., a license plate number of the vehicle equipped with the emergency call terminal device 1, etc.), the phone number of the emergency center, and the data produced by the position determining circuit 14.

The emergency call push button 3 is, as described above, designed to produce the failure signals indicating a disconnection of the emergency call push button 3 from the controller 12 and formation of a short circuit of the controller 12 to ground as well as the ON-signal indicating occurrence of an emergency. When either of the failure signals is inputted, the controller 12 informs the operator of a failure of the emergency call terminal device 1 through an indicator, for example.

Figure 2:
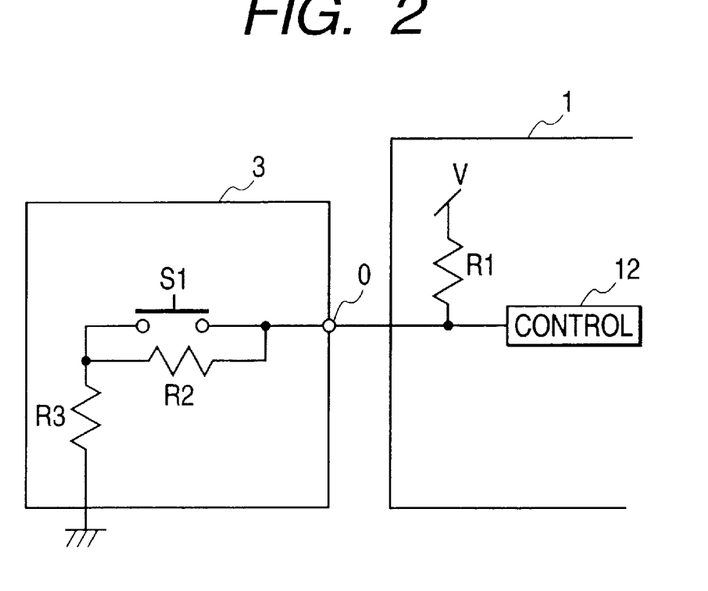
FIG. 2 is a circuit diagram which shows a circuit structure of an emergency call push button according to the first embodiment of the invention.

FIG. 2 shows a circuit structure of the emergency call push button 3.

The emergency call push button 3 includes a normally open switch S1, a resistor R2, and a resistor R3. The resistor R2 is connected to both ends of the switch S1 in parallel. The resistor R3 is connected between the end of the switch S1 and ground. The switch S1 is connected at the other end to an input of the controller 12 through an output O and to a voltage source such as a battery mounted in the vehicle through a resistor R1. The voltage source provides the voltage V.

In this structure, voltages appearing at the input of the controller 12 (1) when the emergency call push button 3 is in the OFF-state, that is, the switch S1 is opened, (2) when the emergency call push button 3 is pushed to close the switch S1, (3) when the switch S1 is disconnected undesirably from the controller 12 to open-circuit the controller 12, and (4) when the controller 12 is short-circuited undesirably to ground are expressed by the following equations.

| (1) OFF-state | $\{(R2 + R3)/(R1 + R2 + R3)\}$ V |
| (2) ON-state | $\{R3/(R1 + R3)\}$ V |
| (3) Open circuit | V |
| (4) Short circuit | 0 |

Specifically, the four different voltages are developed one in each of the cases (1) to (4). The controller 12 receives an input of one of the four voltages through an A/D converter or an A/D converter built in a microcomputer (not shown) to discriminate the four cases (1) to (4) and inform the operator thereof.

Figure 3:
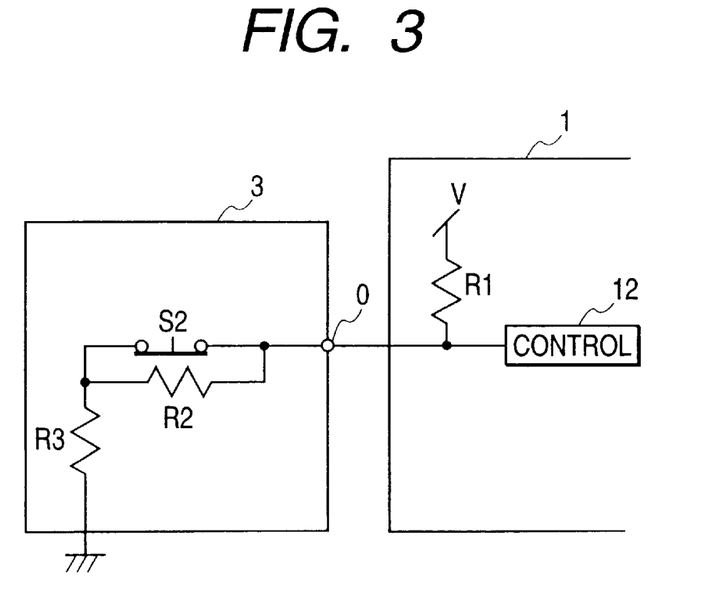
FIG. 3 is a circuit diagram which shows a circuit structure of an emergency call push button according to the second embodiment of the invention.

FIG. 3 shows a circuit structure of the emergency call push button 3 according to the second embodiment of the invention.

The shown circuit structure is different from the one shown in FIG. 2 only in that a normally closed switch S2 is used. Other arrangements are identical, and explanation thereof in detail will be omitted here.

The voltages appearing at the input of the controller 12 in the four cases (1) to (4), as discussed in the first embodiment, are

| (1) OFF-state (switch closed) | $\{R3/(R1 + R3)\}$ V |
| (2) ON-state (switch opened) | $\{(R2 + R3)/(R1 + R2 + R3)\}$ V |
| (3) Open circuit | V |
| (4) Short circuit | 0 |

Figure 4:
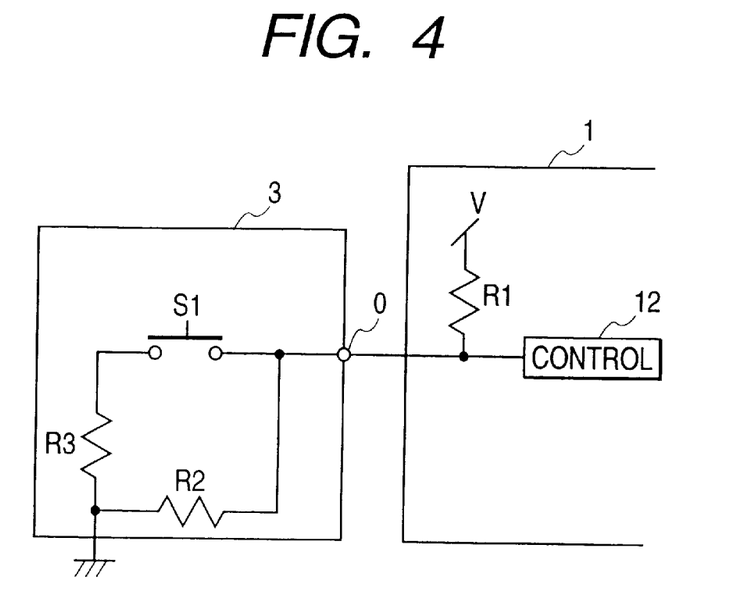
FIG. 4 is a circuit diagram which shows a circuit structure of an emergency call push button according to the third embodiment of the invention.

FIG. 4 shows a circuit structure of the emergency call push button 3 according to the third embodiment of the invention.

The circuit structure of this embodiment is different from the one shown in FIG. 2 only in that the resistor R2 is connected across the switch S1 and the resistor R3. Other arrangements are identical, and explanation thereof in detail will be omitted here.

The voltages appearing at the input of the controller 12 in the four cases (1) to (4), as discussed above, are

| (1) OFF-state | $\{R2/(R1 + R2)\}$ V |
|---|---|
| (2) ON-state | $[\{(R2 \cdot R3)/(R2 + R3)\}/\{R1 + (R2 \cdot R3)/(R2 + R3)\}]$ V |
| (3) Open circuit | V |
| (4) Short circuit | 0 |

Figure 5:
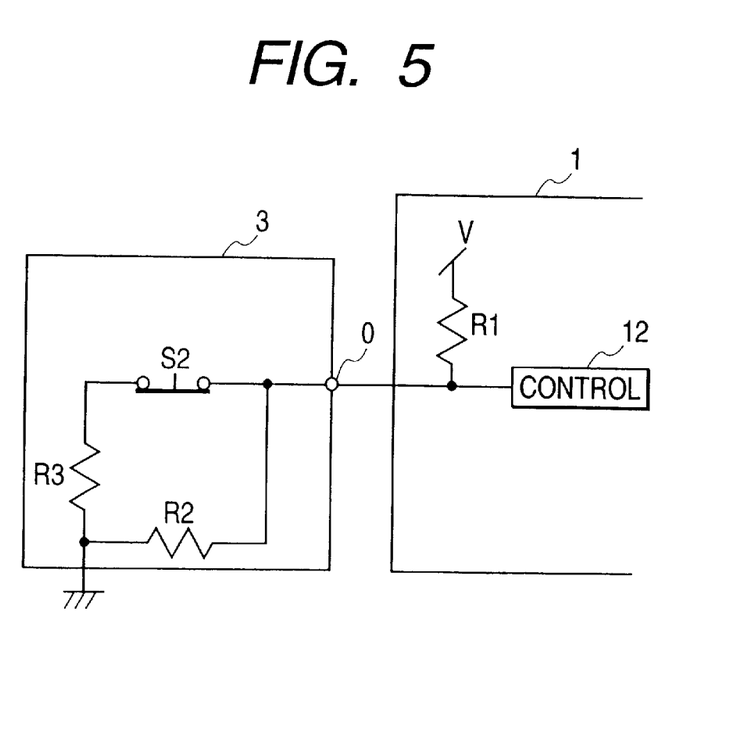
FIG. 5 is a circuit diagram which shows a circuit structure of an emergency call push button according to the fourth embodiment of the invention.

FIG. 5 shows a circuit structure of the emergency call push button 3 according to the fourth embodiment of the invention.

The circuit structure of this embodiment is a modification of the one shown in FIG. 3 and different therefrom only in that the resistor R2 is connected across the switch S1 and the resistor R3. Other arrangements are identical, and explanation thereof in detail will be omitted here.

The voltages appearing at the input of the controller 12 in the four cases (1) to (4), as discussed above, are

| (1) OFF-state (switch closed) | $\{(R2 \cdot R3)/(R2 + R3)\}/\{R1 + (R2 \cdot R3)/(R2 + R3)\}$ V |
|---|---|
| (2) ON-state (switch opened) | $\{R2/(R1 + R2)\}$ V |
| (3) Open circuit | V |
| (4) Short circuit | 0 |

Figure 6:
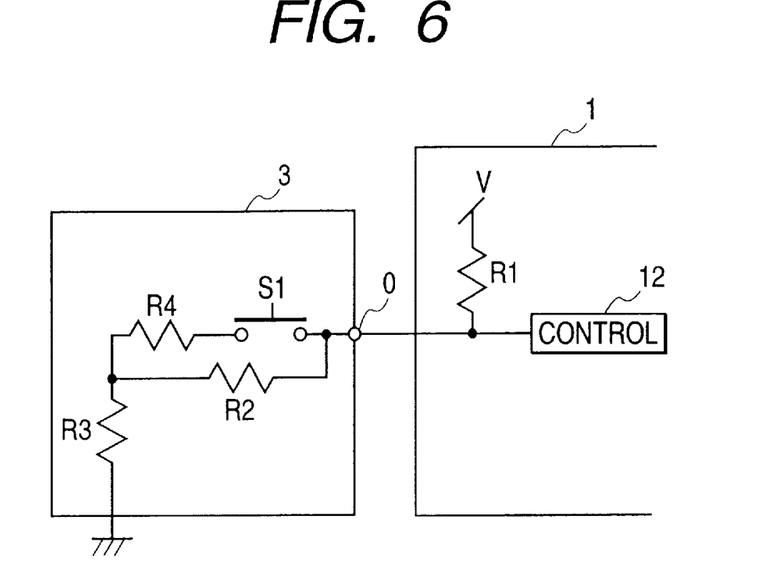
FIG. 6 is a circuit diagram which shows a circuit structure of an emergency call push button according to the fifth embodiment of the invention.

FIG. 6 shows a circuit structure of the emergency call push button 3 according to the fifth embodiment of the invention.

The circuit structure of this embodiment is different from the one shown in FIG. 2 only in that a resistor R4 is further disposed between the switch S1 and the resistor R3 in series. Other arrangements are identical, and explanation thereof in detail will be omitted here.

The voltages appearing at the input of the controller 12 in the four cases (1) to (4), as discussed above, are

| (1) OFF-state | $\{(R2 + R3)/(R1 + R2 + R3)\}$ V |
|---|---|
| (2) ON-state | $[(R3 + R5)/\{R1 + (R3 + R5)\}]$ V |
| (3) Open circuit | V |
| (4) Short circuit | 0 | where $R5=(R2 \cdot R4)/(R2+R4)$

Figure 7:
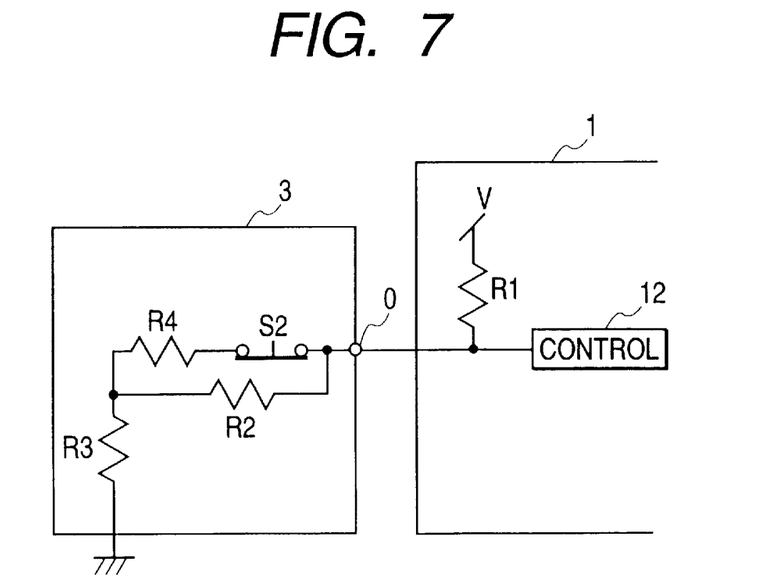
FIG. 7 is a circuit diagram which shows a circuit structure of an emergency call push button according to the sixth embodiment of the invention.

FIG. 7 shows a circuit structure of the emergency call push button 3 according to the sixth embodiment of the invention.

The circuit structure of this embodiment is different from the one shown in FIG. 6 only in that the normally closed switch S2 is used. Other arrangements are identical, and explanation thereof in detail will be omitted here.

The voltages appearing at the input of the controller 12 in the four cases (1) to (4), as discussed above, are

| (1) OFF-state (switch closed) | $[(R3 + R5)/\{R1 + (R3 + R5)\}]$ V |
|---|---|
| (2) ON-state (switch opened) | $\{(R2 + R3)/(R1 + R2 + R3)\}$ V |
| (3) Open circuit | V |
| (4) Short circuit | 0 | where $R5=(R2 \cdot R4)/(R2+R4)$

Figure 8:
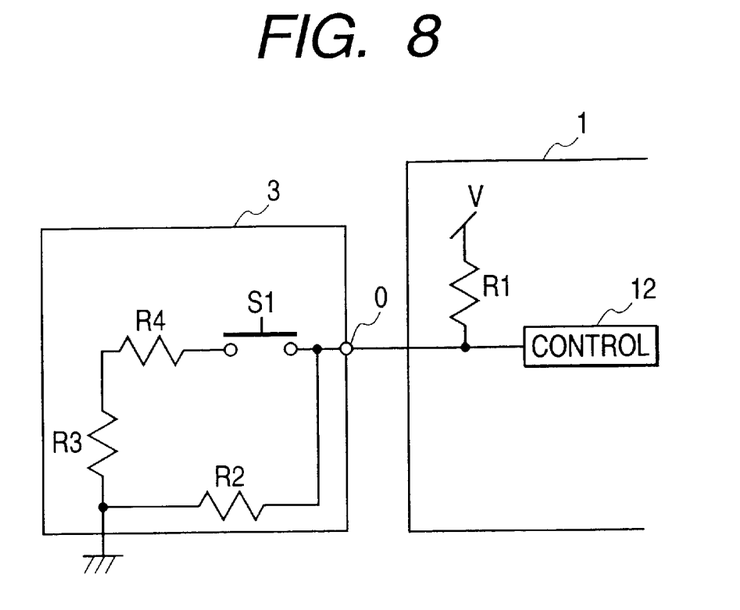
FIG. 8 is a circuit diagram which shows a circuit structure of an emergency call push button according to the seventh embodiment of the invention.

FIG. 8 shows a circuit structure of the emergency call push button 3 according to the seventh embodiment of the invention.

The circuit structure of this embodiment is different from the one shown in FIG. 6 in that the resistor R2 is connected to a junction of the switch S1 and the input of the controller 12 and to ground. Other arrangements are identical, and explanation thereof in detail will be omitted here.

The voltages appearing at the input of the controller 12 in the four cases (1) to (4), as discussed above, are

| (1) OFF-state | $\{R2/(R1 + R2)\}$ V |
|---|---|
| (2) ON-state | $\{R6/(R1 + R6)\}$ V |
| (3) Open circuit | V |
| (4) Short circuit | 0 | where $R6=\{R2 \cdot (R3+R4)\}/(R2+R3+R4)$

Figure 9:
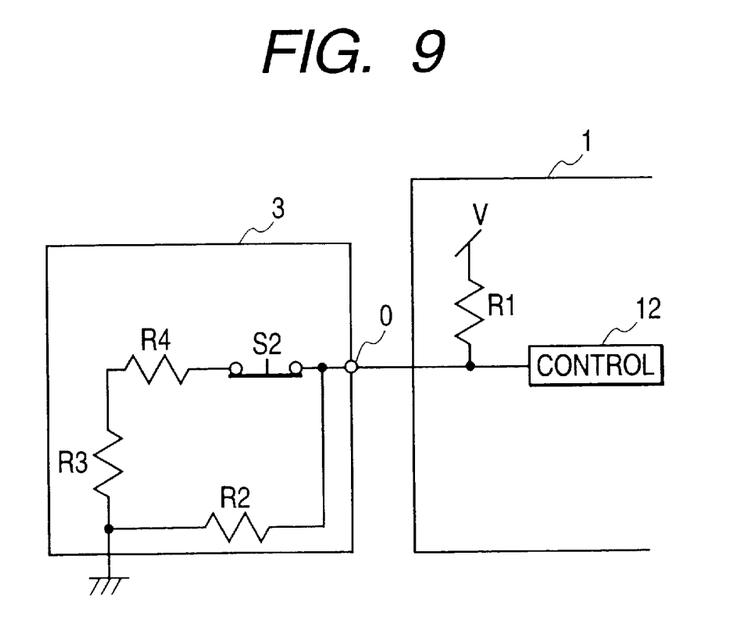
FIG. 9 is a circuit diagram which shows a circuit structure of an emergency call push button according to the eighth embodiment of the invention.

FIG. 9 shows a circuit structure of the emergency call push button 3 according to the eighth embodiment of the invention.

The circuit structure of this embodiment is different from the one shown in FIG. 8 in that the normally closed switch S2 is used. Other arrangements are identical, and explanation thereof in detail will be omitted here.

The voltages appearing at the input of the controller 12 in the four cases (1) to (4), as discussed above, are

| (1) OFF-state (switch closed) | $\{R6/(R1 + R6)\}$ V |
|---|---|
| (2) ON-state (switch opened) | $\{R2/(R1 + R2)\}$ V |
| (3) Open circuit | V |
| (4) Short circuit | 0 | where $R6=\{R2 \cdot (R3+R4)\}/(R2+R3+R4)$

Figure 10:
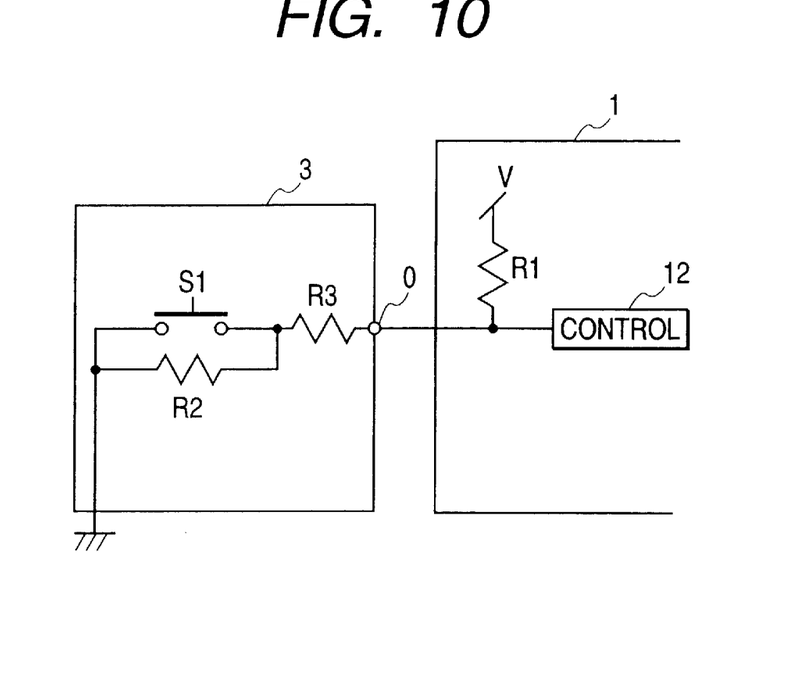
FIG. 10 is a circuit diagram which shows a circuit structure of an emergency call push button according to the ninth embodiment of the invention.

FIG. 10 shows a circuit structure of the emergency call push button 3 according to the ninth embodiment of the invention.

The circuit structure of this embodiment is different from the one shown in FIG. 2 in that the resistor R3 is disposed between the switch S1 and the input of the controller 12 in series. Other arrangements are identical, and explanation thereof in detail will be omitted here.

The voltages appearing at the input of the controller 12 in the four cases (1) to (4), as discussed above, are

| (1) OFF-state | $\{(R2 + R3)/(R1 + R2 + R3)\}$ V |
|---|---|
| (2) ON-state | $\{R1/(R1 + R3)\}$ V |
| (3) Open circuit | V |
| (4) Short circuit | 0 |

Figure 11:
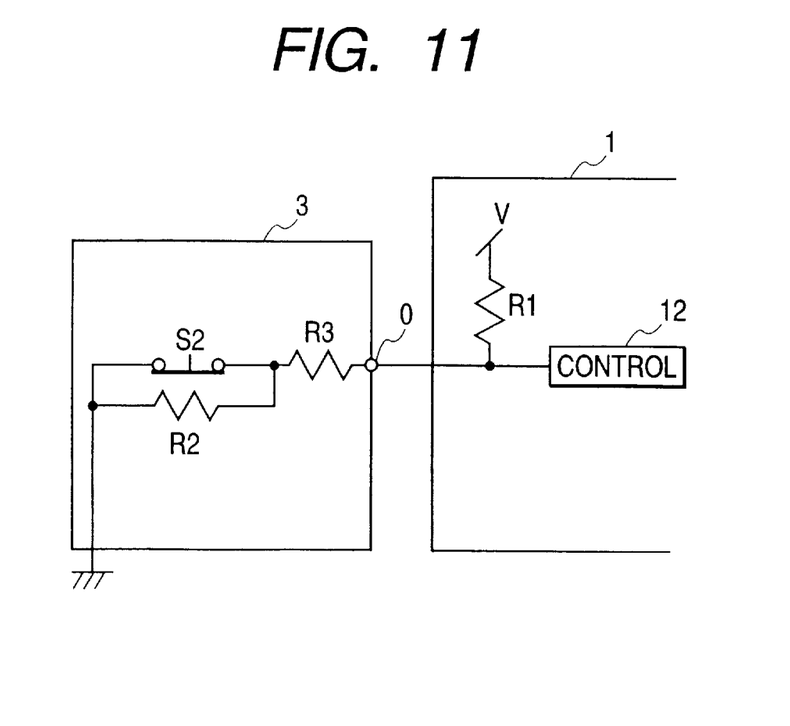
FIG. 11 is a circuit diagram which shows a circuit structure of an emergency call push button according to the tenth embodiment of the invention.

FIG. 11 shows a circuit structure of the emergency call push button 3 according to the tenth embodiment of the invention.

The circuit structure of this embodiment is different from the one shown in FIG. 10 in that the normally closed switch S2 is used. Other arrangements are identical, and explanation thereof in detail will be omitted here.

The voltages appearing at the input of the controller 12 in the four cases (1) to (4), as discussed above, are

| (1) OFF-state (switch closed) | $\{R1/(R1 + R3)\}$ V |
|---|---|
| (2) ON-state (switch opened) | $\{(R2 + R3)/(R1 + R2 + R3)\}$ V |
| (3) Open circuit | V |
| (4) Short circuit | 0 |

Figure 12:
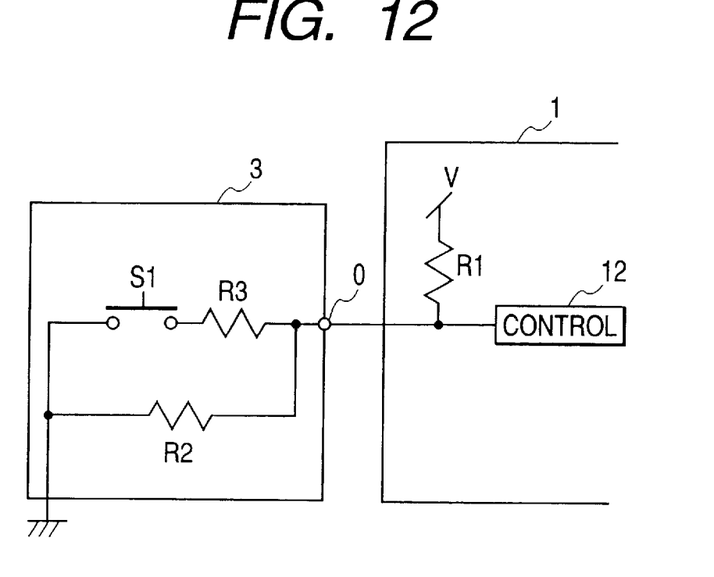
FIG. 12 is a circuit diagram which shows a circuit structure of an emergency call push button according to the eleventh embodiment of the invention.

FIG. 12 shows a circuit structure of the emergency call push button 3 according to the eleventh embodiment of the invention.

The circuit structure of this embodiment is different from the one shown in FIG. 9 in that the resistor R2 is disposed across the switch S1 and the resistor R3. Other arrangements are identical, and explanation thereof in detail will be omitted here.

The voltages appearing at the input of the controller 12 in the four cases (1) to (4), as discussed above, are

| | |
|---|---|
| (1) OFF-state | $\{R2/(R1 + R2)\}$ V |
| (2) ON-state | $[(R2 \cdot R3)/(R2 + R3)]/$ $\{R1 + (R2 \cdot R3)/(R2 + R3)\}]$ V |
| (3) Open circuit | V |
| (4) Short circuit | 0 |

Figure 13:
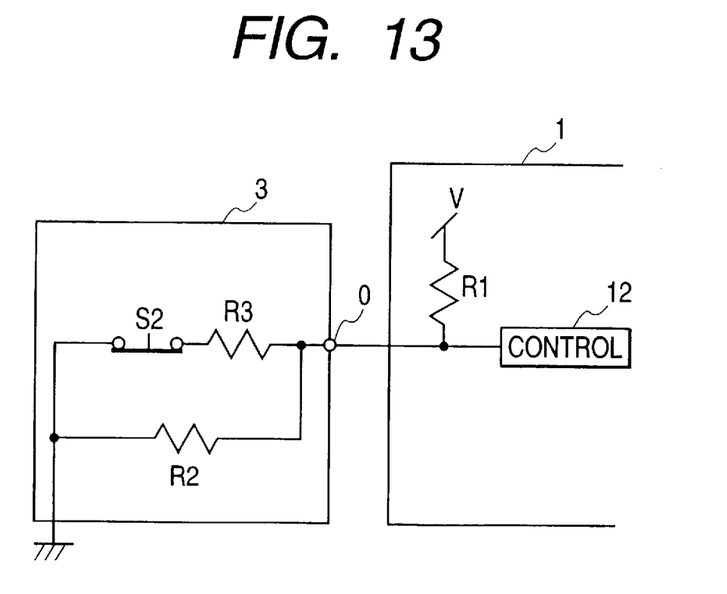
FIG. 13 is a circuit diagram which shows a circuit structure of an emergency call push button according to the twelfth embodiment of the invention.

FIG. 13 shows a circuit structure of the emergency call push button 3 according to the twelfth embodiment of the invention.

The circuit structure of this embodiment is different from the one shown in FIG. 12 in that the normally closed switch S2 is used. Other arrangements are identical, and explanation thereof in detail will be omitted here.

The voltages appearing at the input of the controller 12 in the four cases (1) to (4), as discussed above, are

| | |
|---|---|
| (1) OFF-state (switch closed) | $[\{(R2 \cdot R3)/(R2 + R3)\}/$ $\{R1 + (R2 \cdot R3)/(R2 + R3)\}]$ V |
| (2) ON-state (switch opened) | $\{R2/(R1 + R2)\}$ V |
| (3) Open circuit | V |
| (4) Short circuit | 0 |

Figure 14:
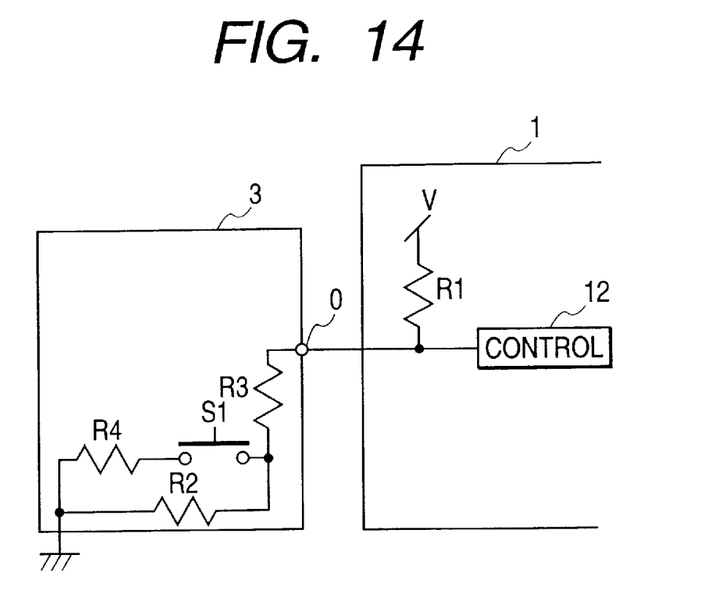
FIG. 14 is a circuit diagram which shows a circuit structure of an emergency call push button according to the thirteenth embodiment of the invention.

FIG. 14 shows a circuit structure of the emergency call push button 3 according to the thirteenth embodiment of the invention.

The resistor R4 is connected at one end to ground and at the other end to the normally open switch S1. The switch S1 is connected at the other end to the controller 12 through the resistor R3 and also connected to the voltage supply through the resistor R1. The resistor R2 is connected at one end to ground and the other end to the resistor R3 in parallel to the resistor R4 and the switch R1.

The voltages appearing at the input of the controller 12 in the four cases (1) to (4), as discussed above, are

| | |
|---|---|
| (1) OFF-state | $\{(R2 + R3)/(R1 + R2 + R3)\}$ V |
| (2) ON-state | $[(R3 + R5)/\{R1 + (R3 + R5)\}]$ V |
| (3) Open circuit | V |
| (4) Short circuit | 0 | where R5=(R2·R4)/(R2+R4)

Figure 15:
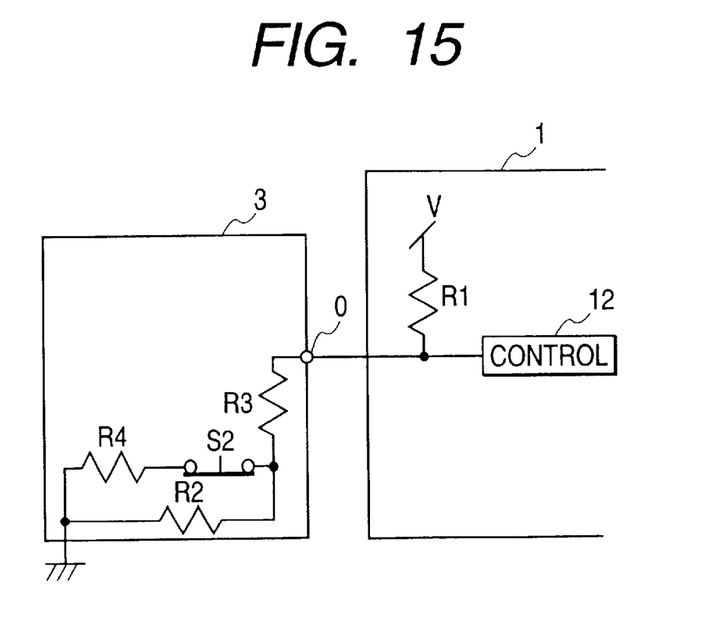
FIG. 15 is a circuit diagram which shows a circuit structure of an emergency call push button according to the fourteenth embodiment of the invention.

FIG. 15 shows a circuit structure of the emergency call push button 3 according to the fourteenth embodiment of the invention.

The circuit structure of this embodiment is different from the one shown in FIG. 14 only in that the normally closed switch S2 is used. Other arrangements are identical, and explanation thereof in detail will be omitted here.

The voltages appearing at the input of the controller 12 in the four cases (1) to (4), as discussed above, are

| | |
|---|---|
| (1) OFF-state (switch closed) | $[(R3 + R5)/\{R1 + (R3 + R5)\}]$ V |
| (2) ON-state (switch opened) | $\{(R2 + R3)/(R1 + R2 + R3)\}$ V |
| (3) Open circuit | V |
| (4) Short circuit | 0 | where R5=(R2·R4)/(R2+R4)

Figure 16:
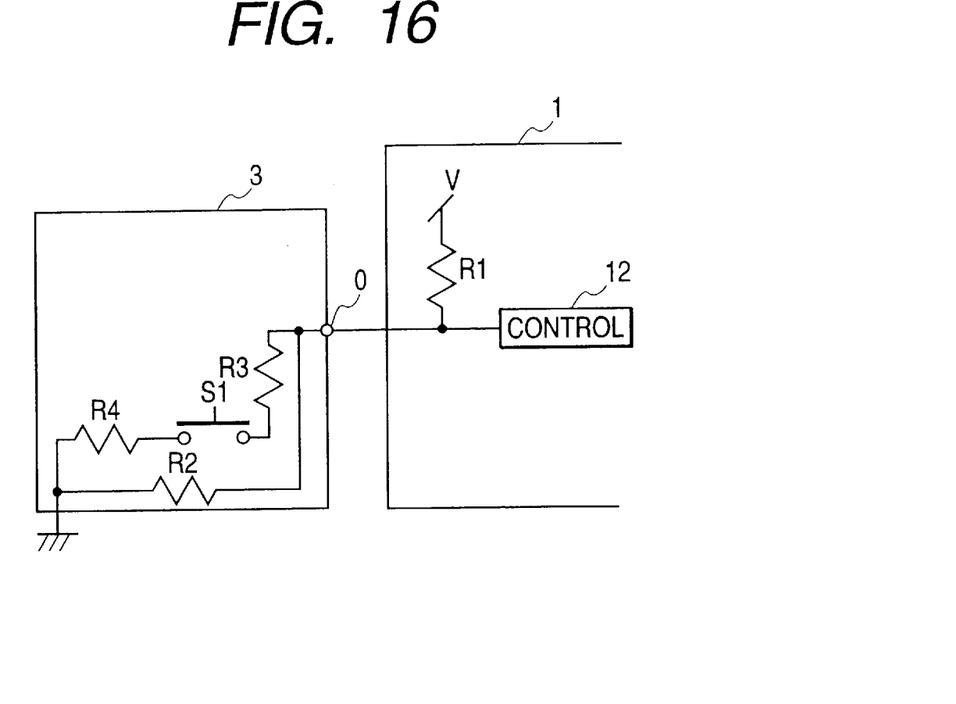
FIG. 16 is a circuit diagram which shows a circuit structure of an emergency call push button according to the fifteenth embodiment of the invention.

FIG. 16 shows a circuit structure of the emergency call push button 3 according to the fifteenth embodiment of the invention.

The circuit structure of this embodiment is different from the one shown in FIG. 14 only in that the resistor R2 is connected at one end to ground and the other end to the output terminal O in parallel to the resistors R3 and R4 and the switch S1. Other arrangements are identical, and explanation thereof in detail will be omitted here.

The voltages appearing at the input of the controller 12 in the four cases (1) to (4), as discussed above, are

| | |
|---|---|
| (1) OFF-state | $\{(R2 + R3)/(R1 + R2 + R3)\}$ V |
| (2) ON-state | $[(R3 + R6)/\{R1 + (R3 + R6)\}]$ V |
| (3) Open circuit | V |
| (4) Short circuit | 0 | where R6=(R2·R4)/(R2+R4)

Figure 17:
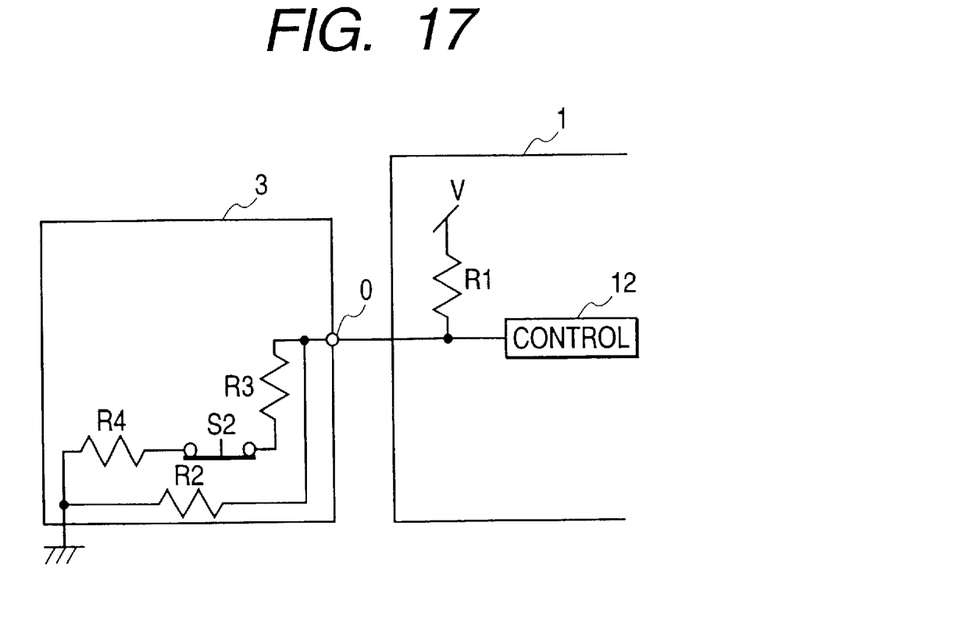
FIG. 17 is a circuit diagram which shows a circuit structure of an emergency call push button according to the sixteenth embodiment of the invention.

FIG. 17 shows a circuit structure of the emergency call push button 3 according to the sixteenth embodiment of the invention.

The circuit structure of this embodiment is different from the one shown in FIG. 16 only in that the normally closed switch S2 is used. Other arrangements are identical, and explanation thereof in detail will be omitted here.

The voltages appearing at the input of the controller 12 in the four cases (1) to (4), as discussed above, are

| | |
|---|---|
| (1) OFF-state (switch closed) | $[(R3 + R6)/\{R1 + (R3 + R6)\}]$ V |
| (2) ON-state (switch opened) | $\{(R2 + R3)/(R1 + R2 + R3)\}$ V |
| (3) Open circuit | V |
| (4) Short circuit | 0 | where R6=(R2·R4)/(R2+R4)

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An emergency call terminal device comprising:
   an emergency call circuit responsive to a call request signal to output an emergency call signal to a preselected emergency center;
   an emergency call switch connected to said emergency call circuit, said emergency call switch being designed to be switched between an ON-state and an OFF-state, the call request signal being provided to said emergency call circuit when said emergency call switch is brought into the ON-state; and
   an operating state signal producing circuit producing a first, a second, a third, and a fourth operating state signal different in voltage level from each other for enabling said emergency call circuit to discriminate the ON-state, the OFF-state, an open circuit-caused failure, and a short circuit-caused failure, the first operating state signal being produced when said emergency call switch is in the ON-state, the second operating state signal being produced when said emergency call switch is in the OFF-state, the third operating state signal being produced when an open circuit is caused by a disconnection of said emergency call circuit from said emergency call switch, the fourth operating state signal being produced when a short circuit is caused between said emergency call circuit and said emergency call switch.

2. An emergency call terminal device as set forth in claim 1, wherein said operating state signal producing circuit includes a first resistor connected to a first and a second end of said emergency call switch, a second resistor connected between the first end of said emergency call switch and ground, and a third resistor connected between a voltage source and a junction of said emergency call circuit and the second end of said emergency call switch.

3. An emergency call terminal device as set forth in claim 1, wherein said operating state signal producing circuit includes a first resistor connected between a first end of said emergency call switch and ground, a second resistor connected between a second end of said emergency call switch and ground, and a third resistor connected between a voltage source and a junction of said emergency call circuit and the second end of said emergency call switch.

4. An emergency call terminal device as set forth in claim 1, wherein said operating state signal producing circuit includes a first and a second resistor connected in series between a first end of said emergency call switch and ground, a third resistor connected between a junction of the first and second resistors and the second end of said emergency call switch, and a fourth resistor connected between a voltage source and a junction of said emergency call circuit and the second end of said emergency call switch.

5. An emergency call terminal device as set forth in claim 1, wherein said operating state signal producing circuit includes a first and a second resistor connected in series between a first end of said emergency call switch and ground, a third resistor connected between ground and a second end of said emergency call switch, and a fourth resistor connected between a voltage source and a junction of said emergency call circuit and the second end of said emergency call switch.

6. An emergency call terminal device as set forth in claim 1, wherein said operating state signal producing circuit includes a first resistor connected to a first end of said emergency call switch leading to ground and a second end of said emergency call switch, a second resistor connected between the second end of said emergency call switch and said emergency call circuit, and a third resistor connected between a voltage source and a junction of said emergency call circuit and the second end of said emergency call switch.

7. An emergency call terminal device as set forth in claim 1, wherein said operating state signal producing circuit includes a first resistor connected to a first end of said emergency call switch and a first junction leading to said emergency call circuit, a second resistor connected to the first junction and ground in parallel to said emergency call switch and the first resistor, and a third resistor connected between a voltage source and a second junction which connects said emergency call circuit and the first junction.

8. An emergency call terminal device as set forth in claim 1, wherein said operating state signal producing circuit includes a first resistor connected between a first end of said emergency call switch and ground, a second resistor connected between a second end of said emergency call switch and said emergency call circuit, a third resistor connected between the second end of said emergency call switch and ground in parallel to said emergency call switch and the first resistor, and a fourth resistor connected between a voltage source and a junction of said emergency call circuit and the second resistor.

9. An emergency call terminal device as set forth in claim 1, wherein said operating state signal producing circuit includes a first resistor connected between a first end of said emergency call switch and ground, a second resistor connected between a second end of said emergency call switch and a first junction leading to said emergency call circuit, a third resistor connected between the first junction and ground in parallel to said emergency call switch and the first and second resistors, and a fourth resistor connected between a voltage source and a second junction which connects the first junction and said emergency call circuit.

10. An emergency call terminal device as set forth in claim 1, wherein said operating signal producing circuit produces the third and fourth operating state signals using functions of pull-up and pull-down resistors.

11. An emergency call terminal device as set forth in claim 1, wherein said emergency call circuit receives the first, the second, the third, and the fourth operating state signals through one of an A/D converter and an A/D converter built in a microcomputer.

12. An emergency call system comprising:
an emergency center; and
an emergency call terminal device including,
(a) an emergency call circuit responsive to a call request signal to output an emergency call signal to said emergency center,
(b) an emergency call switch connected to said emergency call circuit, said emergency call switch being designed to be switched between an ON-state and an OFF-state, the call request signal being provided to said emergency call circuit when said emergency call switch is brought into the ON-state, and
c) an operating state signal producing circuit producing a first, a second, a third, and a fourth operating state signal different in voltage level from each other for enabling said emergency call circuit to discriminate the ON-state, the OFF-state, an open circuit-caused failure, and a short circuit-caused failure, the first operating state signal being produced when said emergency call switch is in the ON-state, the second operating state signal being produced when said emergency call switch is in the OFF-state, the third operating state signal being produced when an open circuit is caused by a disconnection of said emergency call circuit from said emergency call switch, the fourth operating state signal being produced when a short circuit is caused between said emergency call circuit and said emergency call switch.

13. An emergency call terminal device comprising:
an emergency call circuit responsive to a call request signal to output an emergency call signal to a preselected emergency center;
an emergency call switch connected to said emergency call circuit, said emergency call switch being designed to be switched between an ON-state and an OFF-state, the call request signal being provided to said emergency call circuit; and
an operating state signal producing circuit producing a first, a second, a third, and a fourth operating state signal different in voltage level from each other for enabling said emergency call circuit to discriminate the ON-state, the OFF-state, an open circuit state between said emergency call circuit and said emergency call switch, and a short circuit state between said emergency call circuit and said emergency call switch.

14. An emergency call system comprising:

an emergency call center; and an emergency call terminal device including,
- (a) an emergency call circuit responsive to a call request signal to output an emergency call signal to a preselected emergency center;
- (b) an emergency call switch connected to said emergency call circuit, said emergency call switch being designed to be switched between an ON-state and an OFF-state, the call request signal being provided to said emergency call circuit; and
- (c) an operating state signal producing circuit producing a first, a second, a third, and a fourth operating state signal different in voltage level from each other for enabling said emergency call circuit to discriminate the ON-state, the OFF-state, an open circuit state between said emergency call circuit and said emergency call switch, and a short circuit state between said emergency call circuit and said emergency call switch.

* * * * *